(12) United States Patent
Heinzelmann et al.

(10) Patent No.: US 8,016,722 B2
(45) Date of Patent: Sep. 13, 2011

(54) PROCESS AND DEVICE FOR CONTROLLING A GEARSIFT OF AN AUTOMATIC GEARBOX

(75) Inventors: Karl-Fritz Heinzelmann, Meckenbeuren (DE); Bernd Doebele, Salem (DE)

(73) Assignee: ZF Friedrichshafen AG, Friedrichshafen (DE)

(*) Notice: Subject to any disclaimer, the term of this patent is extended or adjusted under 35 U.S.C. 154(b) by 786 days.

(21) Appl. No.: 12/089,765

(22) PCT Filed: Sep. 26, 2006

(86) PCT No.: PCT/EP2006/009330
§ 371 (c)(1),
(2), (4) Date: Apr. 10, 2008

(87) PCT Pub. No.: WO2007/042141
PCT Pub. Date: Apr. 19, 2007

(65) Prior Publication Data
US 2008/0248922 A1 Oct. 9, 2008

(30) Foreign Application Priority Data
Oct. 14, 2005 (DE) .......................... 10 2005 049 178

(51) Int. Cl.
*B60W 10/04* (2006.01)
*B60W 10/02* (2006.01)
(52) U.S. Cl. ........................................ 477/107; 477/181
(58) Field of Classification Search .................. 477/107, 477/111, 112, 181, 180
See application file for complete search history.

(56) References Cited

U.S. PATENT DOCUMENTS

| | | | |
|---|---|---|---|
| 6,835,161 B2 | 12/2004 | Grillenberger et al. | |
| 6,939,267 B2 | 9/2005 | Döbele et al. | |
| 2004/0116248 A1* | 6/2004 | Sakamoto et al. | 477/107 |
| 2004/0147367 A1* | 7/2004 | Rieger et al. | 477/176 |
| 2006/0142118 A1* | 6/2006 | Kupper et al. | 477/107 |

FOREIGN PATENT DOCUMENTS

| | | |
|---|---|---|
| DE | 197 35 759 A1 | 2/1999 |
| DE | 101 50 314 A1 | 5/2002 |
| DE | 102 09 512 A1 | 11/2002 |
| DE | 101 32 738 A1 | 1/2003 |
| DE | 101 35 327 A1 | 1/2003 |
| DE | 103 03 048 A1 | 5/2004 |
| DE | 103 61 299 A1 | 7/2005 |
| EP | 1 439 087 A2 | 7/2004 |
| EP | 1 517 066 A2 | 3/2005 |

* cited by examiner

*Primary Examiner* — Roger Pang
(74) *Attorney, Agent, or Firm* — Davis & Bujold, P.L.L.C.

(57) ABSTRACT

A method for controlling an automatic transmission, which allows changing a gear change and downshifting with minimal interruption of traction while the phase of reduction of the drive torque of the drive motor, the phase interruption of the frictional connection phase in the automatic transmission and the phase of rotational speed adjustment in the transmission input shaft are designed for a suitable target rotational speed such that they at least partially overlap. Upon interruption of the frictional connection in the automatic transmission, the drive motor transmits a drive torque to the input shaft of the automatic transmission, via the main clutch, which adjusts the rotational speed of the input shaft of a transmission to the synchronous speed of the new gear.

7 Claims, 3 Drawing Sheets

PROCESS AND DEVICE FOR CONTROLLING A GEARSIFT OF AN AUTOMATIC GEARBOX

This application is a national stage completion of PCT/EP2006/009330 filed Sep. 26, 2006, which claims priority from German Application Serial No. 10 2005 049 178.2 filed Oct. 14, 2005.

FIELD OF THE INVENTION

The present invention relates to a method for controlling a gear shift of an automatic transmission, as well as an apparatus for performing the same.

BACKGROUND OF THE INVENTION

Automatic transmissions have been used in different types of motor vehicles for a long time. While the driver has to carry out multiple chronologically coordinated and situation-adapted operations with manually shifted transmissions, automatic transmissions relieve the driver of these operations, allowing him to concentrate better on traffic situations.

An experienced driver will certainly be able to arrange the chronological shift arrangement of the main clutch and accelerator pedals, the time and speed of actuation of the gear selection lever and the force acting on the gear selection lever in a plurality of ways, and optimize them according to his respective intention. For example, if he desires an especially comfortable and shock-free gear selection, he will actuate the main clutch pedal rather slowly, after having sensitively released the accelerator pedal. In this situation, he will actuate the gearshift lever only after a short pause, after disengaging the main clutch and avoid excessively rapid shift movements or excessive pedal force. Conventional automatic gearshift controls are frequently based on such shift sequences in order to provide the passengers with high shifting and driving comfort, as well as the possibility of shifting with as little wear as possible.

However, this shifting strategy has the disadvantage that during the shifting operation the traction is interrupted for a relatively long time. Particularly, when high traction is desired, while operating uphill with trailers, for instance, or in normal operation on ramps and other steep gradients, this may lead to the vehicle losing so much speed during this traction interruption, that the originally selected gear can no longer be shifted or, in any case, is no longer the optimum gear. Moreover, even at the desired high vehicle acceleration performance, the negative effect of traction interruption becomes evident. In any case, a shifting strategy of this type impairs the potential driving performance of a vehicle compared with a vehicle with manual transmission and a driver who shifts fast and precisely. Last but not least, this has contributed to the problems in accepting automatic transmissions by some sports-minded drivers.

From DE 101 32 738 A1, a method for controlling gear disengagement in an automatic multi-step transmission is known, in which the drive motor torque is reduced during a gear change. Depending on the vehicle instantaneous acceleration, the main clutch is released when a first acceleration threshold value is reached and the gear is disengaged when a second acceleration threshold value is reached. In the process, the first and second acceleration threshold values are selected and/or chosen independently of one another and, depending on the original acceleration of the vehicle, the currently engaged gear and the injection volume of the motor.

If the first threshold value is reached, once a signal to release the main clutch has been given, a signal to disengage the gear is issued immediately. If the second threshold value has a higher absolute value than the first threshold value, and hence the second threshold value is reached with a drop in acceleration of the vehicle, the signal to disengage the gear will be issued at this moment, while the signal to release the main clutch will only be delivered later, i.e., when the first acceleration threshold value is reached.

The known method is based on the consideration that gear disengagement, independently of the position of the main clutch, is only possible if a relatively low actuating force is sufficient for this purpose. It is apparent from the exemplary embodiment that, at this point, the volume of the fuel injected into the drive motor has long been reduced to zero and hence the still remaining acceleration of the vehicle is essentially due to mass inertia and elastic deformation of elements of the power train and resultant torque at the input side of the transmission. Significant acceleration of the transmission due to early gear disengagement is, therefore, unlikely and not intended in any case.

Thus, DE 101 32 738 A1 provides a valuable approach for the reduction of traction interruption in automatic multi-step transmissions with regard to gear disengagement, but it is based on continuous determination and evaluation of the vehicle acceleration and in no way addresses the problem of engaging a selected target gear as fast and effectively as possible.

Against this background, the object of the present invention is to present a control method for an automatic transmission which allows a gear change and, in particular, downshifting with minimum traction interruption.

SUMMARY OF THE INVENTION

The present invention is based on the knowledge that an interruption in traction during a shifting process may be reduced considerably if it is possible to configure the phase in which the drive motor torque is reduced, the phase in which the frictional connection in the automatic transmission is interrupted and the phase in which the rotational speed of the transmission input shaft is adapted to a suitable target rotational speed such that they at least partially overlap in time.

The present invention is based on a method for controlling a gear change for an automatic transmission 2 with a drive motor 4 acting on an input shaft 6 of the automatic transmission 2 and a drive-connected main clutch 8 arranged between the drive motor 4 and the automatic transmission 2, which may optionally be released or engaged by way of a main clutch splitter 10. It is further based on a control apparatus 12 for coordinating the operation of the automatic transmission 2, the drive motor 4 and the main clutch 8.

The main clutch normally is a friction locked, automatic clutch which, apart from a completely disengaged state with at least almost no torque transmission between the input side and output side of the clutch and a completely engaged state with at least almost complete transmission of torque between the input side and output side of the clutch, also has a state in which the clutch operates with slip and transfers only a part of the applied torque to the output side of the clutch.

Within the scope of the description of the present invention, the exact mounting position of the main clutch is irrelevant, provided the main clutch is operative between the output side of the drive motor and input shaft of the automatic transmission. In a particular case, the main clutch may also be incorporated into the transmission housing. It is further irrelevant whether a plurality of main clutches is arranged in place of the above described main clutch, as long as at least one or more main clutches are able to accomplish the above function in combination.

Coordination of the operation of the automatic transmission, drive motor, and main clutch by the control apparatus includes indirect influence. For example, the control apparatus may send a direct signal to the fuel injection pump in order to reduce the drive torque of the drive motor. However, it is normally reasonable for the control apparatus to send a signal to the engine control apparatus, which accordingly influences the device located there to control the fuel injection volume. Finally, the control apparatus may also send a signal to interconnected apparatuses which prompts them to send signals themselves which will finally achieve the desired objective. In most cases the coordination will include both the reading of data, as well as of the transmission of influencing data to all three components. However, it is also conceivable to derive the behavior of at least one component from data of other components and consequently not to query all components for data. Likewise, at least one component may be selected as an independent reference variable so that as such, it is not influenced by the control apparatus.

To achieve the object, it is provided that when a gear is shifted, the control apparatus coordinates a reduction of the drive torque of the drive motor, a reduction of the main clutch torque and an interruption of the frictional connection in the automatic transmission such that the drive motor transmits a drive torque to the input shaft of the automatic transmission, via a main clutch, when the frictional connection is interrupted in the automatic transmission.

In this case, gearshifting is explicitly not understood as a mere disengagement of a first gear, to be followed by engagement of a new gear with a time offset or at any desired time interval, whereby the drive motor with an at least partially engaged main clutch serves to synchronize the rotational speed of the input shaft of the automatic transmission. A procedure of this type is characterized by a reduction of the drive motor rotational speed to a low level, mostly in the idling speed region and a subsequent increase in the rotational speed of the drive motor in order to achieve a synchronous rotational speed of the transmission input shaft. Thus it is possible to clearly delimit a phase of gear disengagement and a phase, strictly delimited in time and content, of gear engagement from the neutral position of the transmission.

Gearshift operations of this type are known as double clutching and are precisely characterized by long traction interruptions. In this case, in contrast, gearshifting is understood as the disengagement of a gear and the subsequent engagement of a new gear, whereby the operations of disengaging a gear are intended to prepare the engagement of the new gear and thus to minimize traction interruption.

As will be described hereinafter in more detail, the torque applied to the transmission input shaft by the drive motor, via the main clutch, may be either a positive or a negative drive torque, wherein it acts on the input shaft of the automatic transmission, via a clutch operating in slip mode, such that the rotational speed of the shaft is modified in the direction of the target rotational speed that would be reached at the specified vehicle speed with the engaged target gear and completely engaged main clutch.

In a preferred embodiment of the present invention, during downshifts the control apparatus coordinates the reduction of the drive torque of the drive motor, the reduction of the main clutch torque and the interruption of the frictional connection in the automatic transmission such that, with interruption of the frictional connection in the automatic transmission, the drive motor or main clutch transmits a positive drive torque to the input shaft of the automatic transmission, which contributes to acceleration of the input shaft of the automatic transmission to a target rotational speed of a target gear to be engaged. This occurs by way of a temporally overlapping reduction of the drive torque of the drive motor and a partial release of the main clutch with already effective interruption of the frictional connection in the transmission due to the disengagement of the output gear.

The result is that, compared to conventional transmission controls, the current gear (output gear) can be disengaged earlier because it is not necessary to wait for total or nearly total absence of torque. The output gear is already disengaged when the torque from the drive motor acting on the output shaft of the transmission falls below a threshold value, whereby this drop of the torque acting on the transmission input shaft may be achieved basically both by a reduction of the drive torque of the drive motor and by a partial disengagement of the main clutch.

However, it is particularly advantageous if the control apparatus coordinates the reduction of the drive torque of the drive motor and the reduction of the main clutch torque such that both torques are reduced with a time overlap. The consequence of this is that at a moment in which the drive motor provides a positive torque contribution, a part of this torque contribution is transmitted, via the clutch operating in slip mode, to the input shaft of the automatic transmission that at that moment is idling or being switched to idle, with the result being that the shaft is accelerated toward the target speed.

In this way, first, the drive motor is decelerated by the torque delivery to the automatic transmission and by the energy converted to heat by the slip-clutch, and/or an undesired strong increase in the drive motor rotational speed is opposed, which would otherwise arise upon release of the main clutch, for example by way of a time delay between issuance of a command to reduce the injection volume and implementation of the command.

Second, the disengagement of the main clutch can be implemented at an earlier moment compared with conventional controls, since it is not necessary to wait for a significant reduction of the drive torque of the drive motor.

Third, the rotational speed of the transmission input shaft can thus be influenced especially rapidly in the direction of the target rotational speed. In certain situations, it is also possible to dispense with synchronization by way of the transmission's own elements, since only a corresponding command given at the appropriate moment is required to engage a gear.

The appropriate moment may be a moment at which the rotational speed difference between the instantaneous rotational speed of the transmission input and the rotational speed of the transmission input arising when the target gear is engaged is below a predefined threshold. However, even taking into account the reaction time between the issuance of a command to engage a gear and the actual engagement of the gear, it can be selected so early that, considering the reaction time and the predicted change in the rotational speed of the transmission input shaft over this reaction time, precisely the above predefined threshold is reached and/or undershot.

Finally, the method according to the invention provides that the drive motor rotational speed does not need to be lowered to the idling speed region when a gear is shifted but, on the contrary, during the shifting process, the drive motor rotational speed can be accelerated, which after engagement of the target gear, significantly reduces the time interval until possible provision of the maximal achievable engine torque.

On the other hand, during upshift operations, if the control apparatus coordinates the reduction of the drive torque of the drive motor, the reduction of the main clutch torque and the interruption of the frictional connection in the automatic transmission such that, with interruption of the frictional connection in the automatic transmission, the drive motor transmits a negative drive torque, via the main clutch, to the input shaft of the automatic transmission, which contributes to deceleration of the input shaft of the automatic transmission to a target rotational speed of a gear to be engaged, the traction interruption can also be reduced during upshifting and the possible driving performance improved in this way. The above description is essentially valid, but it should be noted that here a rapid reduction of the torque supplied by the drive motor at the input side of the main clutch is decisively important.

In order to support this rapid drive torque reduction of the drive motor, it is conceivable to put the main clutch in a state in which a great amount of energy is converted to heat from friction. In addition, it is also possible to control other consumers, such as generators, air conditioning systems, retarders or brakes especially provided for this purpose or other elements, such that they exert a desired braking torque on the output shaft of the drive motor.

For upshift operations, it is also particularly advantageous, for the reasons explained above, if the control apparatus coordinates the reduction of the drive torque of the drive motor and the reduction of the main clutch torque such that both torques are reduced with temporal overlap.

If the automatic transmission is a claw clutch transmission such that, at least one gear can be shifted by way of a claw clutch, it is also advantageous if the control apparatus issues a signal for the engagement of a target gear as soon as the transmission input rotational speed is at a shiftable distance from the target rotational speed.

Since the main clutch is in slip mode at this moment and the drive motor rotational speed is relatively close to the target speed owing to the aspects of the method explained above, in this case, compared with conventional methods with comparable loading of elements of the power train and comparable effects on driving comfort from a possible shifting jerk, the shiftable distance may clearly be enlarged. Alternatively, especially comfortable and material-sparing shifting is possible with shiftable distance comparable to the state of the art.

If the automatic transmission is a transmission system with forced synchronization, such that at least one gear can be shifted by way of forced synchronization and the control apparatus issues a signal as soon as interruption of the frictional connection in the automatic transmission is concluded, a query to undershoot a maximum rotational speed deviation between the instantaneous input rotational speed of the automatic transmission and the input rotational speed of the automatic transmission resulting from the engaged gear may be dispensed with. The method according to the invention, however, offers a decisive advantage in that it ensures that the rotational speed difference is small compared with prior art and thus the forced synchronization elements are largely protected and, if necessary, can be made smaller and less costly.

An apparatus for carrying out the method according to the present invention shall be presented hereinafter.

The apparatus for controlling gearshifting of an automatic transmission with a drive motor acting on the input shaft of the automatic transmission and a drive-connected main clutch arranged between the drive motor and the automatic transmission, which may be optionally released or engaged by a clutch plate, is characterized in that the control apparatus is provided for the coordination of the automatic transmission, drive motor and main clutch, and configured such that the control apparatus can coordinate a reduction of the drive torque of the drive motor, a reduction of the main clutch torque and interruption of the frictional connection in the automatic transmission during gearshifting such that, on interruption of the frictional connection, the drive motor transmits a drive torque to the input shaft of the automatic transmission via the main clutch.

The control apparatus for the coordination of the automatic transmission, drive motor and main clutch may be in a one-piece design or comprise different subunits connected to one another, which may be designed as separate components or as integral components of other units.

Provided the control apparatus is able to reduce the drive torque of the drive motor and main clutch torque such that both torques are reduced with temporal overlap, all advantages of the method, according to the present invention, may be implemented.

With regard to the expense and costs of the necessary cabling, it is particularly advantageous if the control apparatus for the coordination of the reduction of the drive torque of the drive motor, the reduction of the main clutch torque, the interruption of the frictional connection in the automatic transmission and for starting the engagement of a target gear is connected by way of data lines, via an electronic vehicle, data bus, with at least those control devices of which it is not an integral component. In this way, all data are also available to other control devices, as needed, and already available bus connections may be used, if necessary, at no or minimal additional hardware cost.

BRIEF DESCRIPTION OF THE DRAWINGS

The invention will now be described, by way of example, with reference to the accompanying drawings in which.

DETAILED DESCRIPTION OF THE INVENTION

Figure 1:
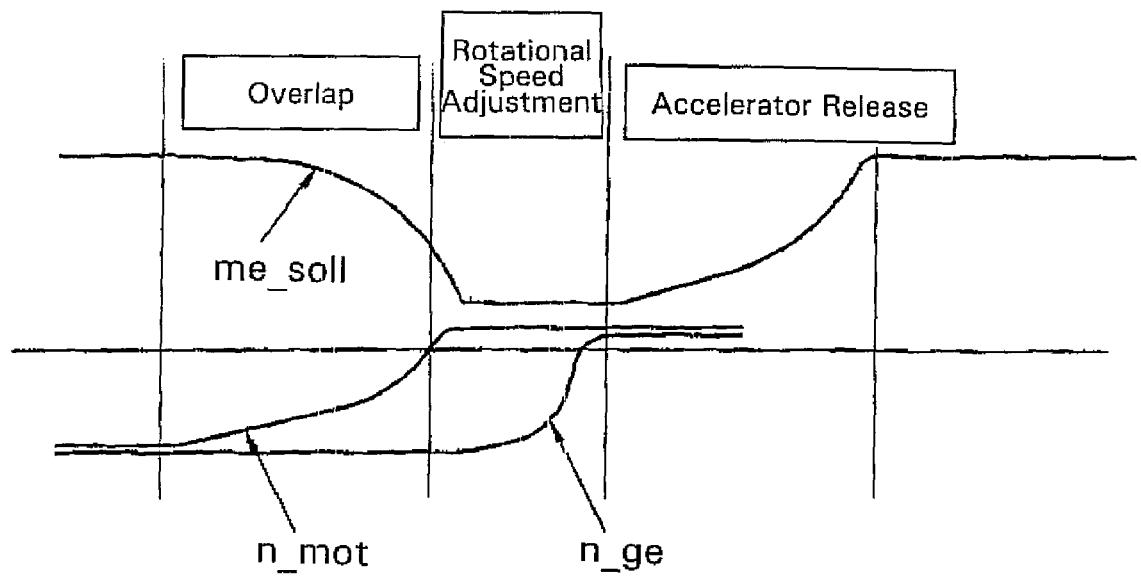
FIG. 1 shows an exemplary sequence of the target injection rate me_soll, the rotational speed of the output shaft of the drive motor n_mot and the speed of the input shaft of the automatic transmission n_ge for a claw-clutch transmission.
Figure 2:
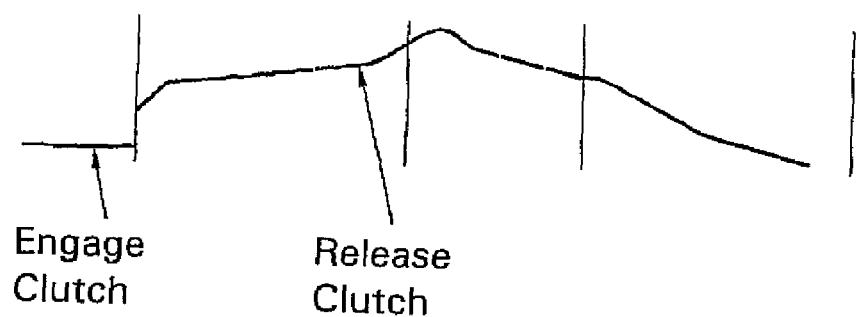
FIG. 2 shows a clutch path of an automatic transmission.
Figure 3:
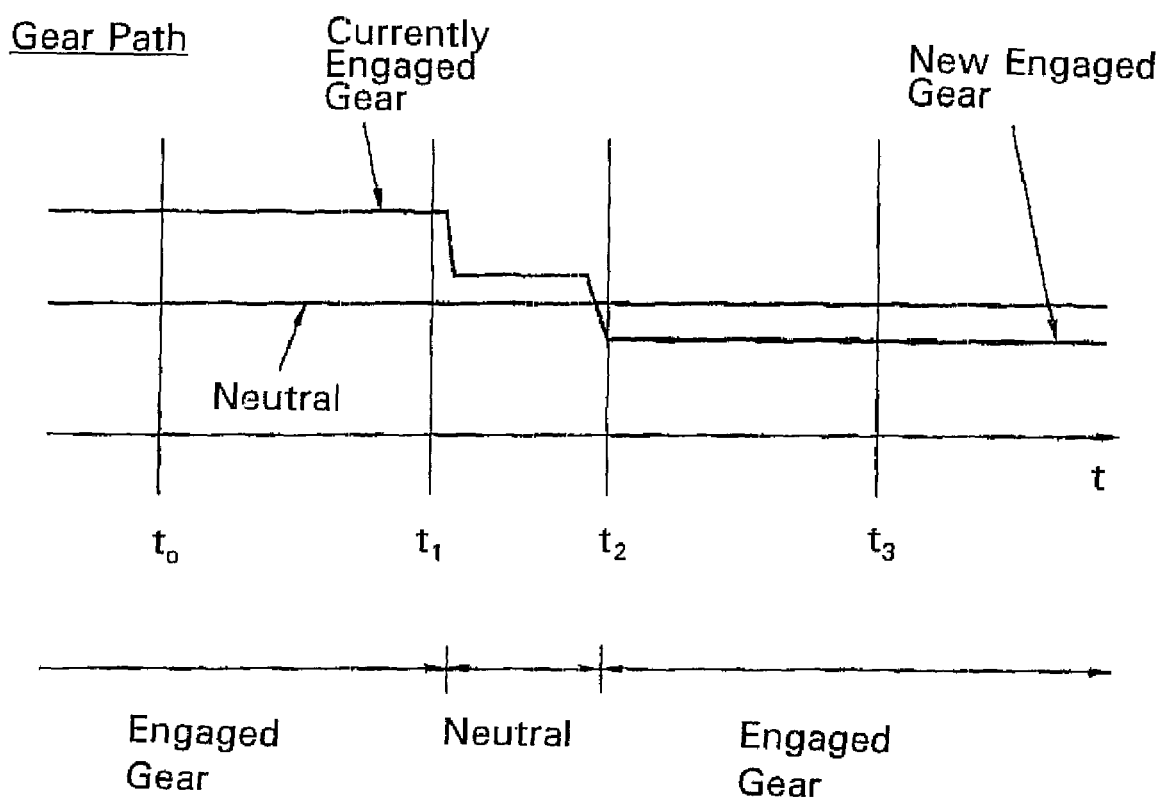
FIG. 3 shows a gear path of the automatic transmission over a period of time t.
Figure 4:
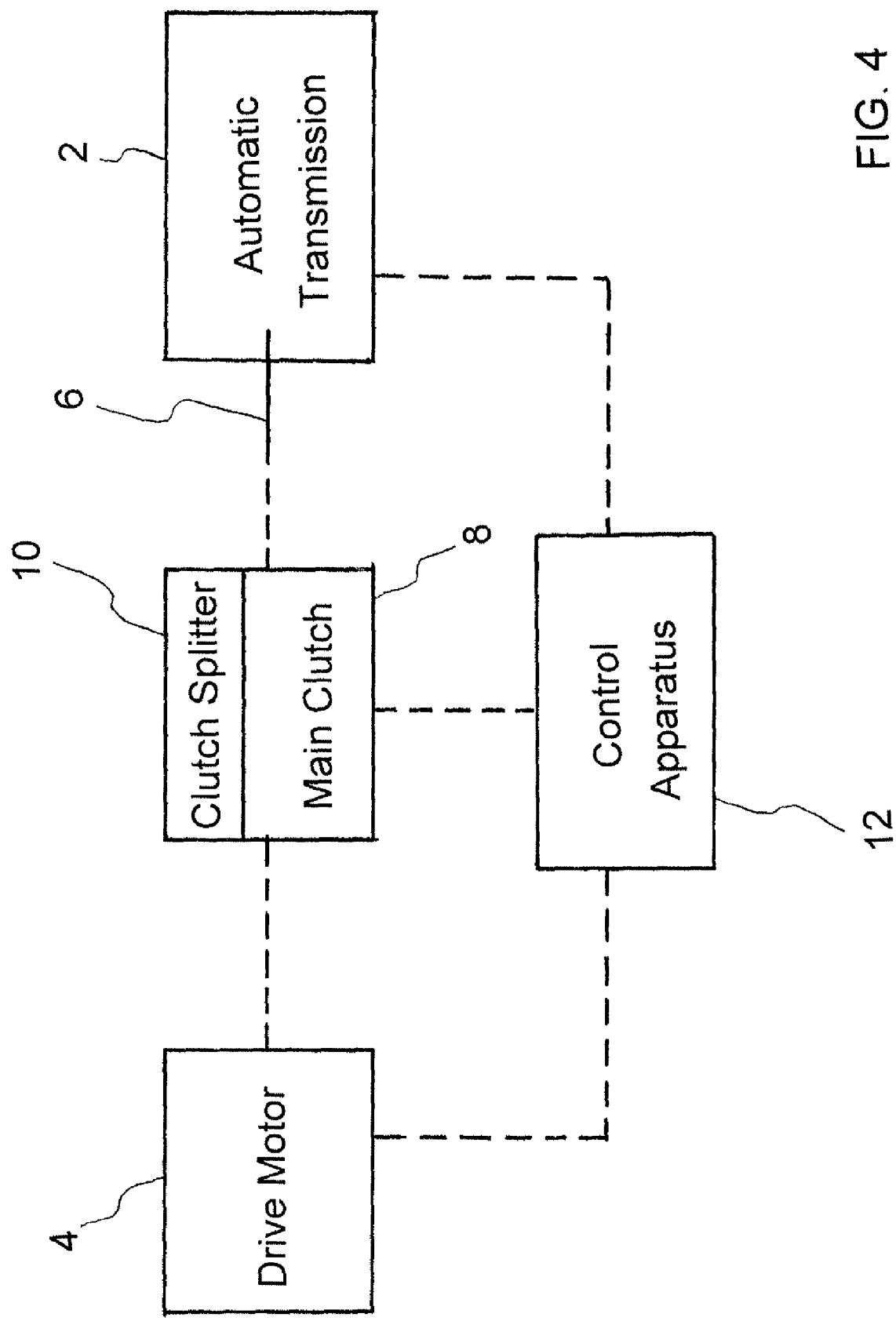
FIG. 4 shows a schematic diagram of a drive assembly which is controlled by a method according to the invention.

Since it is irrelevant for the invention whether the control apparatus acts directly on each of the involved elements and modules or only acts with a coordinating function such that it transmits or provides other control devices with information that is necessary for carrying out the method, primarily the actual events at component level, shall be presented hereinafter.

At a moment $t_0$, the vehicle is in a quasi-static driving mode with an engaged gear. A target injection rate me_soll, which essentially determines the drive motor torque, and here should be used as a synonym for the drive torque, is nearly constant and the main clutch is completely engaged, which is why the rotational speed of a drive motor n_mot and a rotational speed of the automatic transmission input shaft n_ge are identical.

At time $t_1$, a signal is given to initiate a gearshift, whereupon the clutch path in the current completely engaged position is adjusted, first, at high speed and once the slip region of the main clutch has been reached, at lower speed, in the direction of increasing release of the main clutch. Since the gear is still engaged, the rotational speed n_ge of the transmission input shaft is linked to the vehicle speed and, therefore, remains largely constant.

However, once the slip region of the main clutch is reached, the drive motor torque can only be transmitted partially to the automatic transmission. Part of the power provided by the drive motor is converted to heat by the friction elements of the main clutch and to a lesser extent into abrasion, while the drive motor rotational speed n_mot increases, due to this partial disengagement. At the same time, the injection volume me_soll is reduced slightly at first and, in the further course, at an increasing rate of change.

At a time $t_1$, the temporal overlap is concluded and the injection volume me_soll reduced to a low value compared to time to while the rotational speed of the drive motor n_mot increases due to the further release of the main clutch. As the main clutch is released further, a command is given by the control apparatus or by a correspondingly configured transmission control for disengagement of the current gear, which is implemented with a delay contingent on the response time of the actuators.

From the drawing, it is apparent that at the time of gear disengagement, the discontinuation of the braking torque by the automatic transmission due to the previous adjustment of the injection volume and clutch path of the main clutch results in only a very slight change in the rotational speed of the drive motor n_mot. It is further apparent that the rotational speed of the transmission input shaft n_ge is nearly constant until this moment, corresponding to the minor change in the vehicle speed.

When the gear is disengaged, the rotational speed of the transmission input shaft n_ge increases at an increasing rate of change in the direction of the synchronous speed determined by the target gear and vehicle speed. The rapid adjustment of the transmission input rotational speed n_ge is essentially attributable to the clutch path that adjusts in the direction of an engaged main clutch and the rotational speed of the drive motor n_mot, raised to nearly the target speed in this speed adjustment time period $t_1$ to $t_2$.

As soon as the rotational speed of the transmission input shaft n_ge of the automatic transmission is close enough to the drive motor rotational speed n_mot which, in turn, is close or close enough to the rotational speed which results from engaging the target gear and completely engaging the main clutch, shortly before a time designated $t_2$, a signal is issued to engage the target gear and again implemented with minimum time delay by way of actuators. Thus, the gear change as such is concluded.

Subsequently, the clutch path is further adjusted in the direction of the completely engaged position of the main clutch while, at the same time, the target injection volume me_soll is increased first slowly and then with increasing torque transmission capacity of the main clutch at an increasing rate of change.

At a time $t_3$, the gear change is finally concluded also in that the main clutch is thus completely engaged, that it is able to transmit all torque provided by the drive motor slip-free and that the target injection volume me_soll is at the level determined by the driver by way of the accelerator.

REFERENCE NUMERALS me_soll target fuel injection volume of the drive motor
n_mot rotational speed of the output shaft of the drive motor
n_ge rotational speed of the input shaft of the automatic transmission
$t_0, t_1, t_2, t_3$ times

The invention claimed is:

1. A method for controlling a gear shift of an automatic transmission with a drive motor acting on an input shaft of the automatic transmission and a drive-connected main clutch arranged between the drive motor and the automatic transmission, which is one of disengaged and engaged by a main clutch splitter, as well as with a control apparatus for coordinating control of the automatic transmission, the drive motor, and the main clutch, on shifting from a current gear to a target gear, the method comprising the steps of:

coordinating, via the control apparatus, a reduction of a drive torque of the drive motor (me_soll), a reduction of main clutch torque, and an interruption of a frictional connection in the automatic transmission such that the drive torque of the drive motor (me_soll) and the main clutch torque are reduced with a temporal overlap, whereby through the reduction of the main clutch torque, the main clutch reaches a slip region;

at the same time the slip region is reached by the main clutch, reducing the drive torque (me_soll) of the drive motor whereby with a still engaged current gear, the drive torque (me_soll) is transmitted to an input shaft of the automatic transmission by the drive motor in a slip mode, and increasing a rotational speed (n_mot) of the drive motor to nearly a target speed, whereby with further disengagement of the main clutch, the current gear is subsequently disengaged, and with an interruption of the frictional connection in the automatic transmission, transmitting, via the drive motor, the drive torque (me_soll) to the input shaft of the automatic transmission via the main clutch.

2. The method according to claim 1, further comprising the step of, during downshifts, coordinating, via the control apparatus, the reduction of the drive torque of the drive motor (me_soll), the reduction of the main clutch torque, and the interruption of the frictional connection in the automatic transmission such that, with interruption of the frictional connection in the automatic transmission, one of the drive motor and the main clutch transmits a positive drive torque (me_soll) to the input shaft of the automatic transmission, via the main clutch, which contributes to acceleration of the input shaft of the automatic transmission to the target speed of the target gear to be engaged.

3. The method according to claim 1, wherein the automatic transmission is a claw-clutch transmission, and the method further comprising the step of issuing a signal, from the control apparatus, to engage the target gear as soon as the speed of the transmission input (n_ge) is within a shiftable distance of the target speed.

4. The method according to claim 1, further comprising the step of, with the target gear engaged, adjusting the main clutch path in a direction of the completely engaged main clutch, while initially increasing the drive torque of the drive motor (me_soll) slowly at first and then, with increasing torque transmission capacity of the main clutch, increasing a rate of change.

5. A method of controlling a gear shift in an automatic transmission which has an input shaft that is driven by and coupled to a drive motor by a main clutch, the main clutch being engaged and disengaged by a clutch control, which communicates with a control apparatus for coordinating control of the automatic transmission, the drive motor, and the main clutch, and the method comprising the steps of:

when shifting from a current gear to a target gear, coordinating a reduction of the drive torque of the drive motor (me_soll), a reduction of the main clutch torque, and an interruption of the frictional connection in the automatic transmission such that the drive torque of the drive motor (me_soll) and the main clutch torque are reduced with a temporal overlap;

reducing the main clutch torque until the drive torque (me_soll) of the drive motor is reduced and the main clutch is partially engaged;

transmitting the drive torque (me_soll) from the drive motor to the input shaft of the automatic transmission and increasing a rotational speed (n_mot) of the drive motor at least approximately to a target speed, while the current gear is still engaged and while the main clutch is partially engaged; and further disengaging the main clutch and disengaging the current gear and, during the interruption in the frictional connection in the automatic transmission, the drive motor transmitting the drive torque to the input shaft of the automatic transmission via the main clutch.

6. A method for controlling a gear shift of an automatic transmission with a drive motor acting on an input shaft of the automatic transmission and a drive-connected main clutch arranged between the drive motor and the automatic transmission, which is one of disengaged and engaged by a main clutch splitter, as well as with a control apparatus for coordinating control of the automatic transmission, the drive motor, and the main clutch, on shifting from a current gear to a target gear, the method comprising the steps of:

coordinating, via the control apparatus, a reduction of a drive torque of the drive motor (me_soll), a reduction of main clutch torque, and an interruption of a frictional connection in the automatic transmission such that the drive torque of the drive motor (me_soll) and the main clutch torque are reduced with a temporal overlap, whereby through the reduction of the main clutch torque, the main clutch reaches a slip region;

at the same time the slip region is reached by the main clutch, reducing the drive torque (me_soll) of the drive motor whereby with a still engaged current gear, the drive torque (me_soll) is transmitted to an input shaft of the automatic transmission by the drive motor in a slip mode;

controlling a rotational speed (n_mot) of the drive motor to nearly a target speed, whereby with further disengagement of the main clutch, the current gear is subsequently disengaged; and with an interruption of the frictional connection in the automatic transmission, transmitting, via the drive motor, the drive torque (me_soll) to the input shaft of the automatic transmission via the main clutch.

7. The method according to claim 6, further comprising the step of, during upshifts, coordinating, via the control apparatus, the reduction of the drive torque of the drive motor (me_soll), the reduction of the main clutch torque, and the interruption of the frictional connection in the automatic transmission such that, with the interruption of the frictional connection in the automatic transmission, one of the drive motor and the main clutch transmits a negative drive torque (me_soll) to the input shaft of the automatic transmission, via the main clutch, which contributes to deceleration of the input shaft of the automatic transmission to the target speed of the target gear to be engaged.

* * * * *